United States Patent
Hasegawa

(10) Patent No.: US 8,081,831 B2
(45) Date of Patent: Dec. 20, 2011

(54) IMAGE PROCESSOR PERFORMING A HIGH PRECISION RETINEX PROCESS

(75) Inventor: Tomohiko Hasegawa, Aichi-ken (JP)

(73) Assignee: Brother Kogyo Kabushiki Kaisha, Aichi-ken (JP)

( * ) Notice: Subject to any disclaimer, the term of this patent is extended or adjusted under 35 U.S.C. 154(b) by 1082 days.

(21) Appl. No.: 11/848,563

(22) Filed: Aug. 31, 2007

(65) Prior Publication Data

US 2008/0056616 A1    Mar. 6, 2008

(30) Foreign Application Priority Data

Aug. 31, 2006   (JP) .............................. 2006-235535

(51) Int. Cl.
G06K 9/40 (2006.01)
G06K 9/32 (2006.01)
H04N 5/202 (2006.01)

(52) U.S. Cl. .................... 382/254; 382/300; 348/254

(58) Field of Classification Search ............. 382/162, 382/156, 254, 274, 260, 168, 283, 299; 358/518, 358/537, 532, 512, 520, 521, 527

See application file for complete search history.

(56) References Cited

U.S. PATENT DOCUMENTS

| | | | |
|---|---|---|---|
| 6,304,294 B1 | 10/2001 | Tao et al. | |
| 6,658,158 B2* | 12/2003 | Fukuhara et al. | 382/240 |
| 6,741,753 B1 | 5/2004 | Moroney | |
| 6,834,125 B2* | 12/2004 | Woodell et al. | 382/274 |
| 6,842,543 B2* | 1/2005 | Woodell et al. | 382/274 |
| 6,885,482 B1* | 4/2005 | Kubo et al. | 358/518 |
| 6,941,028 B2* | 9/2005 | Kimmel et al. | 382/274 |
| 6,947,176 B1 | 9/2005 | Kubo et al. | |
| 7,251,056 B2 | 7/2007 | Matsushima | |
| 7,298,917 B2 | 11/2007 | Sakatani et al. | |
| 7,508,550 B2 | 3/2009 | Kameyama | |
| 7,570,390 B2 | 8/2009 | Mitsunaga | |

(Continued)

FOREIGN PATENT DOCUMENTS

JP    2000-197052    7/2000

(Continued)

OTHER PUBLICATIONS

L. Meylan and S. Süsstrunk, "Color image enhancement using a Retinex-based adaptive filter," Proc. IS&T Second European Conference on Color in Graphics, Image, and Vision (CGIV 2004), vol. 2, pp. 359-363, 2004.*

(Continued)

*Primary Examiner* — Gregory M Desire
*Assistant Examiner* — Andrae S Allison
(74) *Attorney, Agent, or Firm* — Scully, Scott, Murphy & Presser, PC

(57) ABSTRACT

An image processor includes: a decimal point position determining unit; an image inputting unit; and a calculating unit. The decimal point position determining unit determines a position of a decimal point based on a size of a mask that has a plurality of filter coefficients. The image inputting unit receives image data indicative of an image having a plurality of pixels, the image data including a pixel value for each pixel. The calculating unit performs, while setting a decimal point to be fixed at the determined position, a convolution operation on a pixel value of each pixel and pixel values of peripheral pixels for the each pixel by using the filter coefficients of the mask to find an average peripheral pixel value for the each pixel.

27 Claims, 10 Drawing Sheets

U.S. PATENT DOCUMENTS

| | | | |
|---|---|---|---|
| 7,876,474 B2 * | 1/2011 | Kondo | 358/1.9 |
| 7,885,479 B2 | 2/2011 | Kuno | |
| 7,912,308 B2 | 3/2011 | Kuno | |
| 7,920,752 B2 | 4/2011 | Kuno | |
| 2002/0131652 A1 | 9/2002 | Yoda | |
| 2003/0026494 A1 * | 2/2003 | Woodell et al. | 382/260 |
| 2003/0072496 A1 * | 4/2003 | Woodell et al. | 382/260 |
| 2004/0052414 A1 | 3/2004 | Schroder | |
| 2004/0091164 A1 * | 5/2004 | Sakatani et al. | 382/254 |
| 2005/0074163 A1 | 4/2005 | Shaked | |
| 2005/0226526 A1 | 10/2005 | Mitsunaga | |
| 2006/0062562 A1 | 3/2006 | Utagawa | |
| 2007/0040914 A1 | 2/2007 | Katagiri et al. | |
| 2008/0107333 A1 | 5/2008 | Mazinani et al. | |

FOREIGN PATENT DOCUMENTS

| | | |
|---|---|---|
| JP | 2001-69525 | 3/2001 |
| JP | 2001-78025 | 3/2001 |
| JP | 2002-281347 | 9/2002 |
| JP | 2003-69822 | 3/2003 |
| JP | 2003-219182 | 7/2003 |
| JP | 2003-333331 | 11/2003 |
| JP | 2004-165840 | 6/2004 |
| JP | 3731577 | 10/2005 |
| JP | 2006-114005 | 4/2006 |

OTHER PUBLICATIONS

Japanese Official Action dated Sep. 14, 2010 together with a partial English language translation.

Japanese Official Action dated Nov. 24, 2010 together with a English language translation from U.S. Appl. No. 11/848,692.

Notice of Allowance dated Aug. 19, 2011 from related U.S. Appl. No. 11/864,251.

Japanese Decision of Rejection dated Feb. 22, 2011 together with partial English language translation from Japanese application 2006-235823 in related U.S. Appl. No. 11/848,692.

Jobson et al., "A Multiscale Retinex for Bridging the Gap Between Color Images and the Human Observation of Scenes", IEEE Transaction of Image Processing, vol. 6, No. 7, Jul. 1997, pp. 965-976.

Hines et al., "DSP Implementation of the Retinex Image Enhancement Algorithm", Proceedings of the SPIE Visual Information Processing XIII, vol. 5348 (2004), pp. 13-24.

U.S. Official Action dated Mar. 10, 2011 from related U.S. Appl. No. 11/864,251.

U.S. Official Action dated Jun. 23, 2011 from related application U.S. Appl. No. 12/057,838.

* cited by examiner (PROCESS EXECUTED ON THE PRINTER)

FIG.6

TABLE FOR PHOTO MODE

| PRINT MODE | PAPER TYPE | PAPER SIZE | ORIGINAL IMAGE SIZE | REDUCED IMAGE SIZE | REDUCTION ALGORITHM |
|---|---|---|---|---|---|
| PHOTO MODE | GLOSSY PAPER | 4″ × 6″ | 600 × 800[pixel] | 150 × 200[pixel] | ME |
| | | | 1200 × 1600[pixel] | 300 × 400[pixel] | ME |
| | | | 2400 × 3200[pixel] | 450 × 600[pixel] | ME |
| | | 5″ × 7″ | 600 × 800[pixel] | 150 × 200[pixel] | ME |
| | | | 1200 × 1600[pixel] | 300 × 400[pixel] | ME |
| | | | 2400 × 3200[pixel] | 450 × 600[pixel] | ME |
| | | LETTER | 600 × 800[pixel] | 300 × 400[pixel] | BL |
| | | | 1200 × 1600[pixel] | 450 × 600[pixel] | BL |
| | | | 2400 × 3200[pixel] | 450 × 600[pixel] | ME |
| | | A4 | 600 × 800[pixel] | 300 × 400[pixel] | BL |
| | | | 1200 × 1600[pixel] | 450 × 600[pixel] | BL |
| | | | 2400 × 3200[pixel] | 450 × 600[pixel] | ME |
| | PLAIN PAPER | 4″ × 6″ | 600 × 800[pixel] | 150 × 200[pixel] | NN |
| | | | 1200 × 1600[pixel] | 150 × 200[pixel] | NN |
| | | | 2400 × 3200[pixel] | 150 × 200[pixel] | BL |
| | | 5″ × 7″ | 600 × 800[pixel] | 150 × 200[pixel] | NN |
| | | | 1200 × 1600[pixel] | 150 × 200[pixel] | NN |
| | | | 2400 × 3200[pixel] | 150 × 200[pixel] | BL |
| | | LETTER | 600 × 800[pixel] | 150 × 200[pixel] | NN |
| | | | 1200 × 1600[pixel] | 300 × 400[pixel] | NN |
| | | | 2400 × 3200[pixel] | 300 × 400[pixel] | NN |
| | | A4 | 600 × 800[pixel] | 150 × 200[pixel] | NN |
| | | | 1200 × 1600[pixel] | 300 × 400[pixel] | NN |
| | | | 2400 × 3200[pixel] | 300 × 400[pixel] | NN |

FIG.7

TABLE FOR NORMAL MODE

| PRINT MODE | PAPER TYPE | PAPER SIZE | ORIGINAL IMAGE SIZE | REDUCED IMAGE SIZE | REDUCTION ALGORITHM |
|---|---|---|---|---|---|
| NORMAL MODE | GLOSSY PAPER | 4″ × 6″ | 600 × 800[pixel] | 150 × 200[pixel] | BL |
| | | | 1200 × 1600[pixel] | 150 × 200[pixel] | BL |
| | | | 2400 × 3200[pixel] | 300 × 400[pixel] | BL |
| | | 5″ × 7″ | 600 × 800[pixel] | 150 × 200[pixel] | BL |
| | | | 1200 × 1600[pixel] | 150 × 200[pixel] | BL |
| | | | 2400 × 3200[pixel] | 300 × 400[pixel] | BL |
| | | LETTER | 600 × 800[pixel] | 150 × 200[pixel] | BL |
| | | | 1200 × 1600[pixel] | 300 × 400[pixel] | BL |
| | | | 2400 × 3200[pixel] | 300 × 400[pixel] | BL |
| | | A4 | 600 × 800[pixel] | 150 × 200[pixel] | BL |
| | | | 1200 × 1600[pixel] | 300 × 400[pixel] | NN |
| | | | 2400 × 3200[pixel] | 300 × 400[pixel] | BL |
| | PLAIN PAPER | 4″ × 6″ | 600 × 800[pixel] | 150 × 200[pixel] | NN |
| | | | 1200 × 1600[pixel] | 150 × 200[pixel] | NN |
| | | | 2400 × 3200[pixel] | 150 × 200[pixel] | NN |
| | | 5″ × 7″ | 600 × 800[pixel] | 150 × 200[pixel] | NN |
| | | | 1200 × 1600[pixel] | 150 × 200[pixel] | NN |
| | | | 2400 × 3200[pixel] | 150 × 200[pixel] | NN |
| | | LETTER | 600 × 800[pixel] | 150 × 200[pixel] | NN |
| | | | 1200 × 1600[pixel] | 150 × 200[pixel] | NN |
| | | | 2400 × 3200[pixel] | 150 × 200[pixel] | NN |
| | | A4 | 600 × 800[pixel] | 150 × 200[pixel] | NN |
| | | | 1200 × 1600[pixel] | 150 × 200[pixel] | NN |
| | | | 2400 × 3200[pixel] | 150 × 200[pixel] | NN |

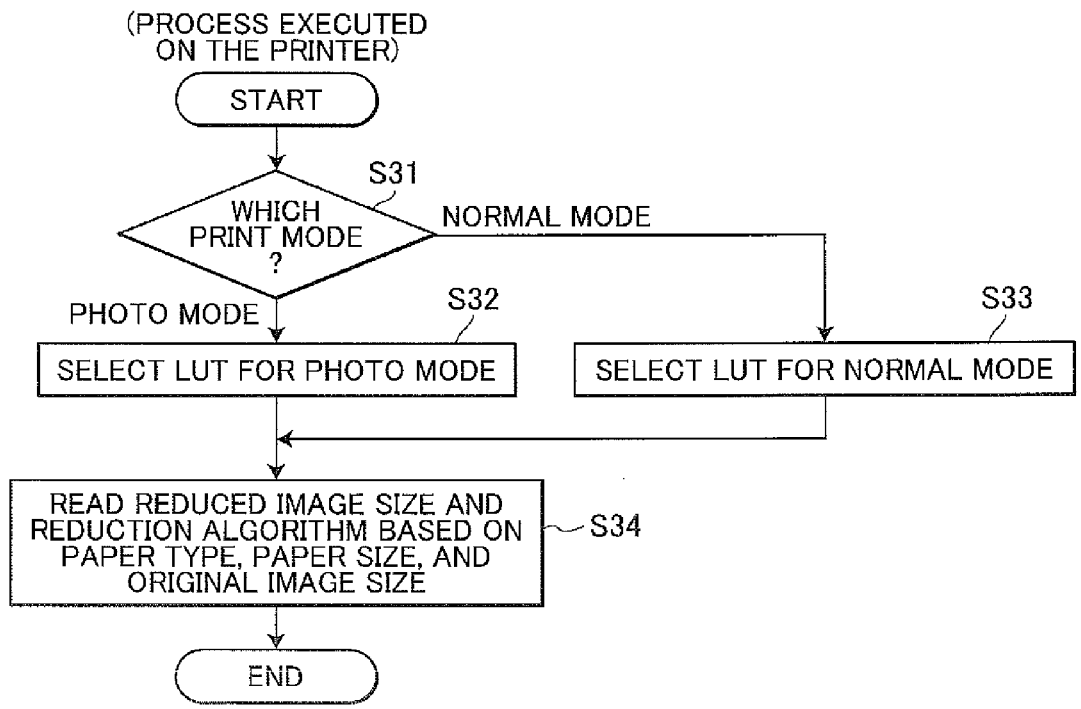
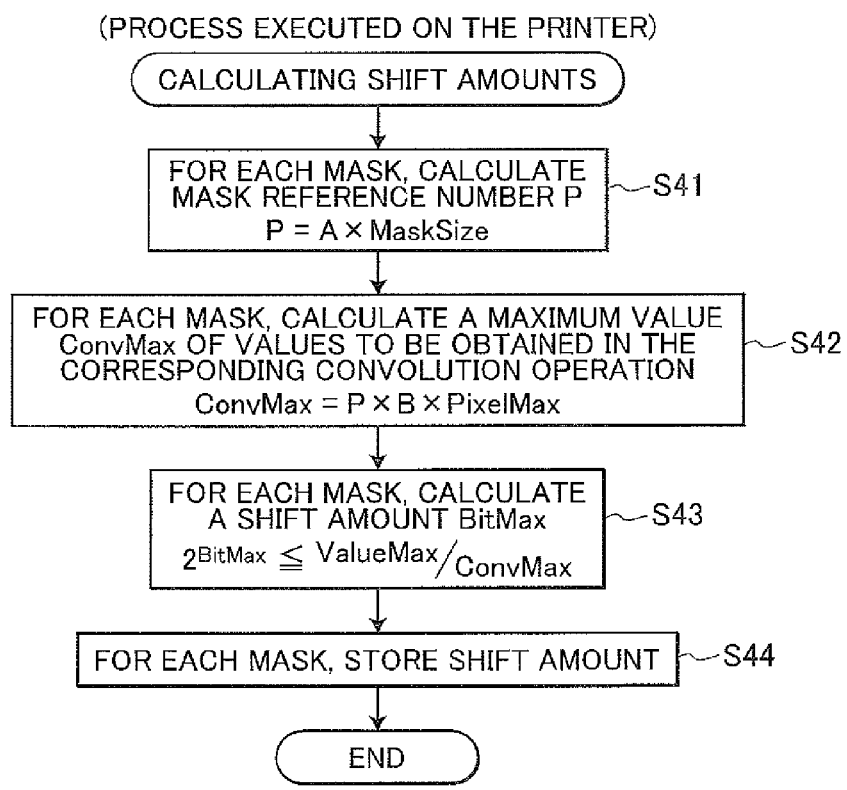

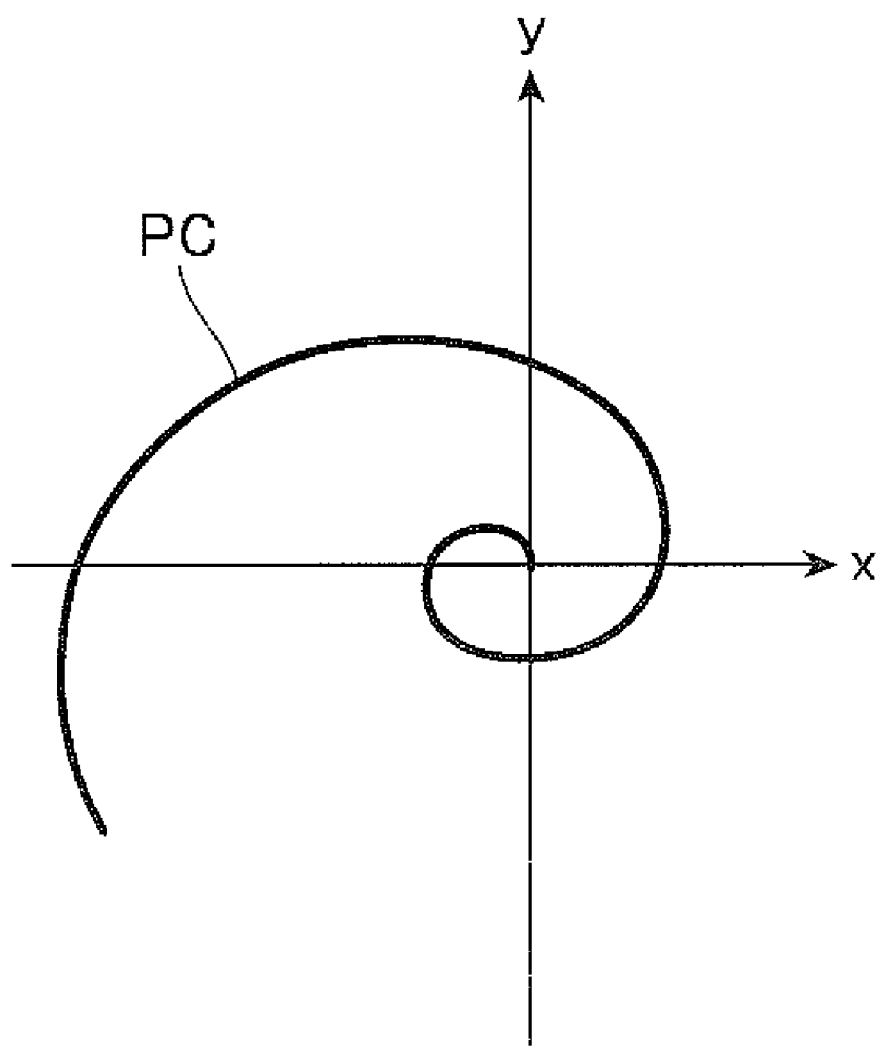

IMAGE PROCESSOR PERFORMING A HIGH PRECISION RETINEX PROCESS

CROSS REFERENCE TO RELATED APPLICATION

This application claims priority from Japanese Patent Application No. 2006-235535 filed Aug. 31, 2006. The entire content of this priority application is incorporated herein by reference.

TECHNICAL FIELD

The present invention relates to an image processor or image processing device and an image-processing method, and particularly to an image processor and an image-processing method capable of performing a convolution operation during a Retinex process with high precision.

BACKGROUND

When taking a photograph of a subject under backlit conditions, e.g. against the sun, the image of the subject portion is an indistinct backlit image with low lightness and contrast, making it difficult to make out details of the subject. Image processing is performed to improve the quality of these backlit images, as well as images suffering in quality due to overexposure, underexposure, blurring due to jiggling when capturing the image, noise, insufficient light, and the like, in order to improve lightness and contrast in the image. One method used in conventional image processing is a Retinex process.

The Retinex process preserves the input image data for high-quality regions and improves the image quality primarily in low-quality regions. The Retinex process performs convolution operation by using Gaussian filters to calibrate pixel data in the original image to values reflecting data of surrounding pixels, calculates reflectance component data for the original image from the natural logarithm of the calibrated pixel data, and calculates illuminance component data by dividing pixel data of the original image by reflectance component data of the original image. Specifically, this process divides the original image into reflectance components and illuminance components. Next, a process is performed to calibrate the brightness and level (contrast) of the illuminance component through gamma correction or the like and subsequently generates improved image data for the original image in backlit portions and the like by combining the calibrated illuminance components with the reflectance components.

U.S. Pat. No. 6,885,482 (corresponding to Japanese Patent Application Publication No. 2001-69525) discloses a method of converting RGB values to a color space configured of a luminance component and color components, such as YCbCr or YIQ, performing the Retinex process only on the luminance component Y, while maintaining the color components, and converting the values back to RGB. Calibrating only the luminance component (i.e. not calibrating the color components) prevents an upset in the color balance and a shift in color. Further, since the Retinex process is performed only on the luminance component, this method requires fewer calculations than a method for performing the Retinex process on each RGB plane and, hence, can complete the process quicker.

U.S. Patent Application Publication No. 2004/0091164 (corresponding to Japanese Patent No. 3,731,577) discloses a method for improving the processing speed in the Retinex process. This method forms a reduced image (low-resolution image) from the original image using the average pixel method or the like, forms a peripheral (or surrounding) average pixel value image (blurred image) by finding the peripheral average pixel value for each pixel in the reduced image, forms a Retinex processed image from the original image and an image produced by expanding the blurred image, and forms an output image from the original image and the Retinex processed image.

SUMMARY

The convolution operation multiplies the plurality of filter coefficients constituting the Gaussian filter and the values of pixels constituting the image and accumulates the products.

It is an object of the present invention to provide an image processor and an image-processing method capable of performing convolution operations in the Retinex process with high precision.

In order to attain the above and other objects, the invention provides an image processor including: a decimal point position determining unit; an image inputting unit; and a calculating unit. The decimal point position determining unit determines a position of a decimal point based on a size of a mask that has a plurality of filter coefficients The image inputting unit receives image data indicative of an image having a plurality of pixels, the image data including a pixel value for each pixel. The calculating unit performs, while setting a decimal point to be fixed at the determined position, a convolution operation on a pixel value of each pixel and pixel values of peripheral pixels for the each pixel by using the filter coefficients of the mask to find an average peripheral pixel value for the each pixel.

According to another aspect, the present invention provides a method of processing an image, the method including: determining a position of a decimal point based on a size of a mask that has a plurality of filter coefficients; receiving image data indicative of an image having a plurality of pixels, the image data including a pixel value for each pixel; and performing, while setting a decimal point to be fixed at the determined position, a convolution operation on a pixel value of each pixel and pixel values of peripheral pixels for the each pixel by using the filter coefficients of the mask to find an average peripheral pixel value for the each pixel.

According to another aspect, the present invention provides a computer-readable storage medium storing a set of program instructions executable on a computer, the program instructions including: determining a position of a decimal point based on a size of a mask that has a plurality of filter coefficients; receiving image data indicative of an image having a plurality of pixels, the image data including a pixel value for each pixel; and performing, while setting a decimal point to be fixed at the determined position, a convolution operation on a pixel value of each pixel and pixel values of peripheral pixels for the each pixel by using the filter coefficients of the mask to find an average peripheral pixel value for the each pixel.

BRIEF DESCRIPTION OF THE DRAWINGS

In the drawings:

FIG. 6 is a table for a photo mode referenced when the print mode is set to the photo mode;

FIG. 7 is a table for a normal mode referenced when the print mode is set to the normal mode;

FIG. 8 is a flowchart illustrating steps in a process for referencing the tables;

FIG. 9(c) shows a polar coordinate function that can be employed to determine positions in a mask at which coefficients exist; and FIG. 10 is a flowchart illustrating steps in a process for determining shift amounts.

DETAILED DESCRIPTION

An image processor according to an embodiment of the present invention will be described with reference to drawings.

Figure 1:
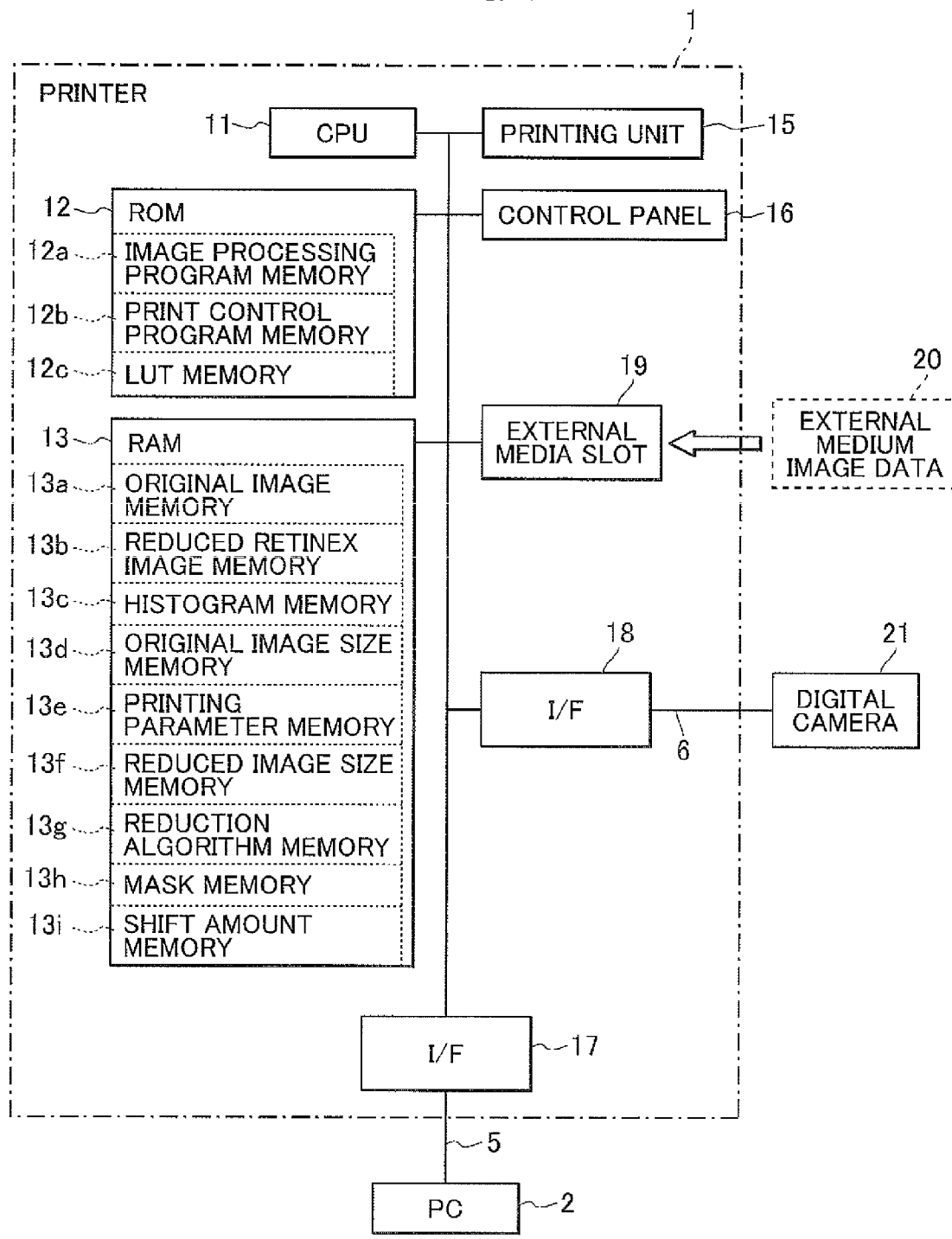
FIG. 1 is a block diagram showing the electrical structure of a printer provided with an image-processing program according to an embodiment.

FIG. 1 is a block diagram showing the electrical structure of a printer 1 having a function for performing an image process according to the embodiment. In the embodiment, the printer 1 is connected to a personal computer (hereinafter referred to as a "PC") 2, a digital camera 21, and/or an external medium 20 An image-processing program installed on the printer 1 executes a Retinex process on image data (image data for an original document or the like) inputted from the PC 2, digital camera 21, or external medium 20. The image-processing program corrects low-quality regions of the image data, such as backlit image regions.

As shown in FIG. 1, the printer 1 includes a CPU 11, a ROM 12, a RAM 13, a printing unit 15, and a control panel 16. The printing unit 15 has a print head and the like for printing out image data on a printing medium, such as paper. The control panel 16 has a user operating unit configured of a ten-key pad and the like, for example, enabling the user to input values for the size of the outputted image and the like.

The printer 1 also includes an interface 17, an interface 18, and an external media slot 19. The interface 17 is provided for connecting the printer 1 to the PC 2 with a cable 5. The interface 18 is provided for connecting the printer 1 to the digital camera 21 with a cable 6. The external media slot 19 allows the user to detachably mount the external medium 20 in the printer 1, the external medium 20 being a flash memory, such as an SD card ox a Memory Stick, for example. The interfaces 17 and 18 use the Universal Serial Bus (USB) communication method.

Accordingly, image data stored on the PC 2 can be inputted into the printer 1 via the cable 5 and the interface 17, while image data captured by the digital camera 21 can be inputted into the printer 1 via the cable 6 and the interface 18. Further, image data stored on the external medium 20 can be inputted into the printer 1 when the external medium 20 is mounted in the external media slot 19.

Through operations on the PC 2, the user can set the printing mode of the printer 1 to a high-quality photo mode or a normal-quality normal mode, and can set the type of recording medium to glossy paper, inkjet papers or plain paper. The user can also set the size of the recording medium to A4, B5, letter, and the like. The user-specified printing parameters are inputted into the printer 1 via the cable 5 and interface 17 and stored in a printing parameter memory 13e of the RAM 13.

The CPU 11 is an arithmetic processor that controls the overall operations of the printer 1. The ROM 12 stores various control programs executed by the CPU 11 and fixed values used when the CPU 11 executes the programs. The ROM 12 includes an image-processing program memory 12a storing an image-processing program for performing such image processing as the Retinex process, and a print control program memory 12b storing a print control program for executing a printing operation. The image-processing program will be described later with reference to the flowcharts of FIGS. 3, 5, 8, and 10.

The RAM 13 is a rewritable random-access memory that includes a work area for storing a set of registers required when the CPU 11 executes the control programs, and a temporary area for temporarily storing data during such processes. The RAM 13 also includes an original image memory 13a, a reduced Retinex image memory 13b, a histogram memory 13c, an original image size memory 13d, the printing parameter memory 13e, a reduced image size memory 13f, a reduction algorithm memory 13g, a mask memory 13h, and a shift amount memory 13i. The original image memory 13a stores original image data. The reduced Retinex image memory 13b stores reflectance values found in a Retinex process performed on reduced images. The histogram memory 13c stores the frequencies of reflectance values for finding parameters for normalization. The original image size memory 13d stores the size of the original image. The printing parameter memory 13e stores user-specified printing parameters. The reduced image size memory 13f stores the size of a reduced image determined based on the printing parameters and the like. The reduction algorithm memory 13g stores a reduction algorithm determined based on the printing parameters and the like. The mask memory 13h stores: coefficients of a mask for the original image used when finding an average peripheral (or surrounding) luminance of a target pixel in the original image; and coefficients of a mask for the reduced image used when finding an average peripheral luminance of a target pixel in the reduced image. The shift amount memory 13i stores: the position of a decimal point for convolution operations using the mask for the original image; and the position of a decimal point for convolution operations using the mask for the reduced image. The mask for the reduced image will be also referred to as "reduced image mask" hereinafter. The mask for the original image will be also refer:red to as "original image mask" hereinafter.

The original image memory 13a stores image data inputted from the PC 2, digital camera 21, and external medium 20 via the interface 17, interface 18, and external media slot 19, respectively. The original image data is stored in the original image memory 13a in one-line units. A reduced image is formed when data of the necessary number of lines is stored in the original image memory 13a. One line of original image data is stored in the original image memory 13a when the reduction algorithm is the nearest neighbor method, two lines when the reduction algorithm is the bi-linear method, three lines when the reduction algorithm is the bi-cubic algorithm, and a line number corresponding to the reduction ratio when the reduction algorithm is the average pixel method. In the embodiment, the original image data and output image data are configured of RGB values, each of which has a data size (or data length) of 8 bits indicating a value in the range 0-255.

The RGB values include components representing the three primary colors of light, i.e. an R value representing red, a G value representing green, and a B value representing blue.

The combination of RGB values for each pixel of an input image indicates one color (hue, intensity, etc.). The greater the RGB values, the higher the luminance (brightness).

Data representing the size of an original image, such as the number of horizontal and vertical pixels, is attached to the original image data and stored in the original image size memory 13*d*.

The reduced Retinex image memory 13*b* is used for storing reflectance values that are found in the Retinex process for only the luminance signals of the reduced original image.

The histogram memory 13*c* is used for tabulating the frequency of the reflectance values to form a histogram. After the histogram is created, an upper limit and lower limit of a clipped range are set as parameters for normalization based on the histogram.

The original image size memory 13*d* stores the size of an original image extracted from the original image data when the original image data is read from the PC 2 or the like. The original image size stored in original image size memory 13*d* is referenced for determining the size of the reduced image and the reduction algorithm.

The printing parameter memory 13*e* stores parameters set by the user indicating whether the print mode is the high-quality photo mode or the normal quality normal mode; whether the type of recording medium is glossy paper, inkjet paper, or plain paper; and whether the size of the recording medium is A4, B5, letter, or the like. These printing parameters can be set by the user on the PC 2 and inputted into the printer 1 or may be set through operating buttons provided on the control panel 16.

When the printing mode is selected, the printing resolution, droplet size, and the like established for the print mode are stored as parameters, and the printing process is executed based on these parameters.

The size of a reduced image and an algorithm for reducing the original image are set based on these printing parameters and the size of the original image and are stored in the reduced image site memory 13*f* and reduction algorithm memory 13*g*, respectively. Generally, a large reduced image size is set when emphasizing image quality over processing speed, while a small reduced image size is set when emphasizing processing speed over image quality The algorithm used for reducing the original image may be one of the nearest neighbor method for sampling the value of a pixel nearest a position in the original image corresponding to a pixel of the reduced image and for using the sampled pixel value as it is, and the bi-linear method, average pixel method, or the like for performing interpolation using pixels surrounding a position in the original image corresponding to a pixel in the reduced image. The nearest neighbor method is used when processing speed is given priority over image quality, and the bi-cubic method or average pixel method is used when giving priority to image quality over processing speed.

The mask memory 13*h* stores the masks (filters) used for finding the average peripheral luminance for each pixel. The masks stored in the mask memory 13*h* include the mask for the reduced image and the mask for the original image.

The Size of the mask for the reduced image is preset to a predetermined size (9×9, in this example). Accordingly, the size of the reduced image mask is fixed regardless of the size of the reduced image The size of the original image mask is determined based on the size of the reduced image mask and based on a reduction ratio of the reduced image relative to the original image.

After the size of the reduced image mask is set, a Gaussian function is used to calculate coefficients constituting the reduced image mask based on distances from a position in the center of the mask corresponding to a target pixel. The coefficients of the reduced image mask are stored in the mask memory 13*h*.

Similarly, after the size of the original image mask is set, the Gaussian function is again used to calculate coefficients constituting the original image mask based on distances from a position in the center of the mask corresponding to a target pixel The coefficients of the original image mask are stored in the mask memory 13*h*.

The shift amount memory 13*i* stores: a decimal point position (shift amount) for performing convolution using the reduced image mask; and a decimal point position (shift amount) for performing convolution using the original image mask. In the convolution operation, the value (luminance value) of each pixel is multiplied by the filter coefficient corresponding to that pixel, and the products are added together. According to the present embodiment, the product of the pixel value and filter coefficient is calculated with a fixed decimal point, and therefore can be quickly performed. Each register can store results of calculations with a limited number of digits. Overflow may occur when adding the products if the decimal point position is set to a higher-order digit or to the left side on the other hand, while there is no danger of overflow if the decimal point position is set to a lower-order digit or to the right side, sufficient precision cannot be obtained. Therefore, an optimal decimal point position must be set.

So, when the reduced image mask is set, an optimal decimal point position is calculated from the number of bits for pixel values (luminance values), the reduced image mask coefficients, and the like. Similarly, when the original image mask is set, an optimal decimal point position is calculated from the number of bits for pixel values, the original image mask coefficients, and the like. Each decimal point position is referred to as a shift amount, by which the position of the decimal point is shifted from a predetermined position (most significant bit (MSB) location, in this example) in each register. In this way, the shift amount is calculated for each of the reduced image mask and the original image mask and stored in the shift amount memory 13*i*.

The control panel 16 is provided with LCDs for indicating printing parameters and the like, and various buttons for setting printing parameters or parameters related to image processing and for indicating a desire to execute an image process or a printing process.

Figure 2:
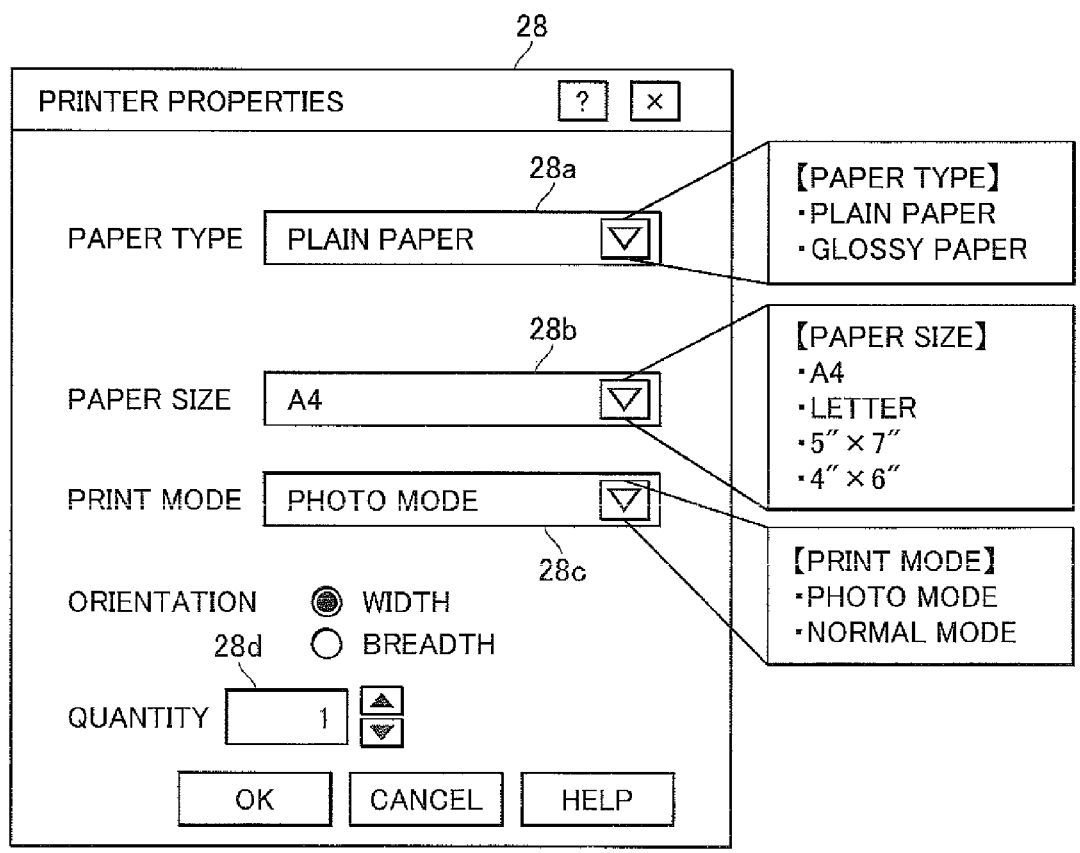
FIG. 2 is an explanatory diagram showing a window for setting printing parameters.

Next, various printing parameters set on the PC 2 connected to the printer 1 will be described with reference to FIG. 2. FIG. 2 shows a printing parameter setting window 28 displayed on a display unit of the PC 2 when the user selects an option to set the printing parameters.

The printing parameter setting window 28 includes a paper type selection box 28*a* for selecting a type of printing paper for the printing process, a paper size setting box 28*b* for setting the size of the paper, a print mode setting box 28*c* for setting the print mode, and a quantity setting box 28*d* for setting the quantity to be printed.

The paper type selection box 28*a* has a display area for displaying the selected paper type, and a downward-pointing triangular-shaped icon positioned in the right end of this display area. The user can display the pull-down menu shown in FIG. 2 by operating the mouse to align a cursor with the icon and performing a mouse click. By further aligning the cursor with an item in the subsequently displayed pull-down menu and clicking a button on the mouse, the user can select the item indicated by the cursor.

In the embodiment, the user can select plain paper or glossy paper as the paper type. Plain paper is currently selected in the example of FIG. 2.

Similarly, the paper size setting box 28b has an area displaying the selected paper size, and an icon indicating a pull-down menu for selecting a paper size. The user can select one of A4, letter, 5"×7", and 4"×6" as the paper size.

The print mode setting box 28c also has an area displaying the selected print mode, and an icon indicating a pull-down menu for selecting a print mode. The user can select either the photo mode or the normal mode as the print mode. The photo mode is used for printing in a higher quality than in the normal mode at a higher resolution. For example, the resolution in the photo mode is 1200×1200 dpi, while the lower resolution in the normal mode is 600×600 dpi. When the printer 1 is of an inkjet type, the printer 1 may be configured to use different droplet sizes and different types of ink based on the resolution.

The quantity setting box 28d is configured of an area for displaying the quantity to be printed. To the right of this area are provided an upward-pointing triangular-shaped incrementing icon for increasing the quantity, and a downward-pointing triangular-shaped decrementing icon for decreasing the quantity The user can set the printing quantity by aligning the cursor with these icons and clicking the mouse.

In addition to the icons described above, the printing parameter setting window 28 also includes radio buttons for setting the orientation of the image printed on the paper, an OK button for making the settings effective while closing the settings window, a Cancel button for closing the settings window without making the settings effective, and a Help button for displaying a window with an explanation of the settings Printing parameters set on the PC 2 in this way are inputted into the printer 1 via the cable 5 and the interface 17 and stored in the printing parameter memory 13e.

Figure 3:
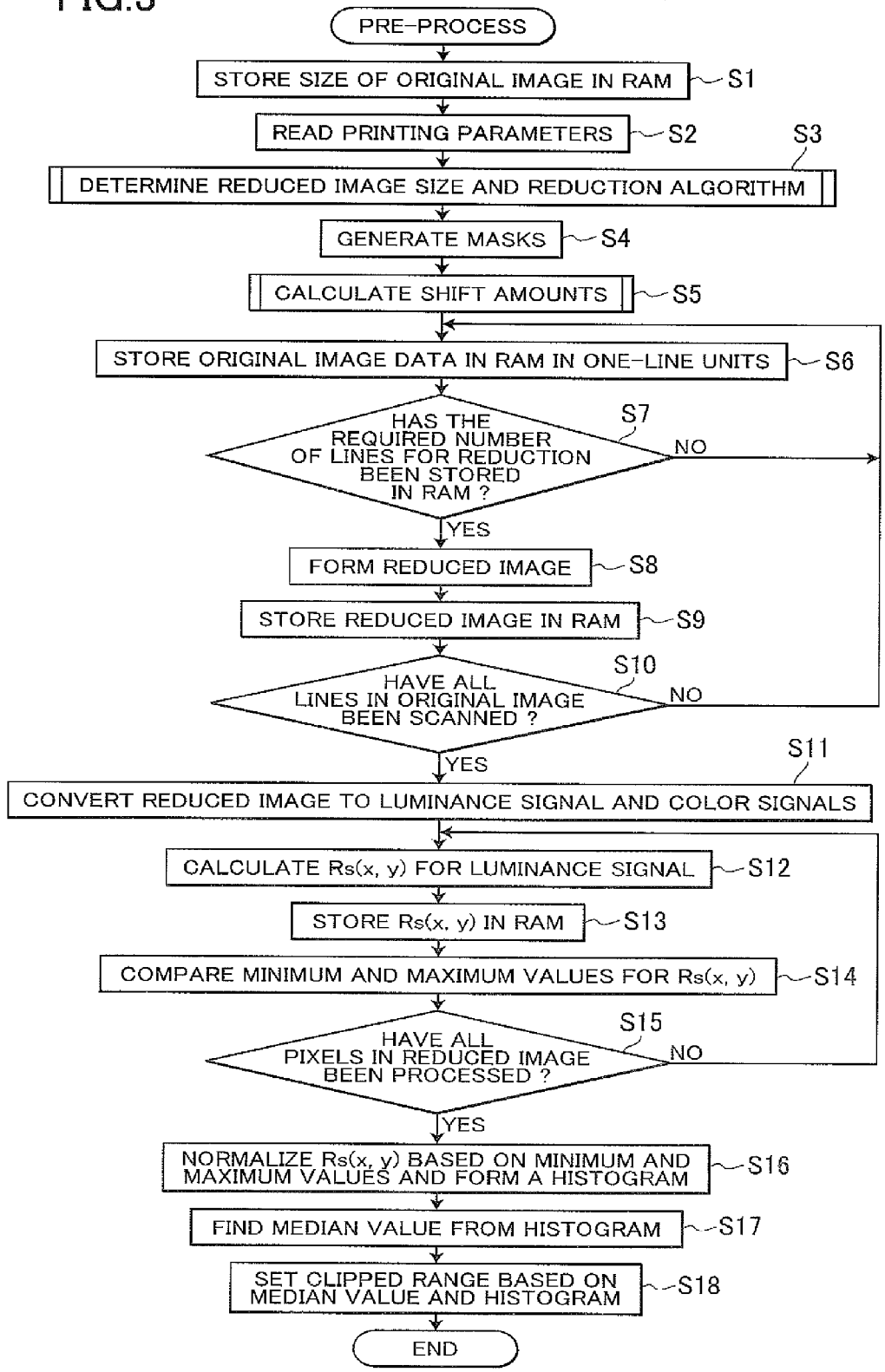
FIG. 3 is a flowchart illustrating steps in a pre-process performed according to the image-processing program.

Next, an image process executed on the CPU 11 will be described with reference to FIGS. 3 through 5. FIGS. 3 and 5 are flowcharts illustrating steps in the image process. The process shown in FIG. 3 is referred to as a pre-process in which the original image is reduced and a clipped range is set for normalizing the reflectance values for the original image based on the reduced image.

In S1 of the pre-process, the CPU 11 stores data indicating the original image size attached to the original image data in the original image size memory 13d. The data indicating the image size is expressed by the number of vertical and horizontal pixels constituting the original image, which is normally rectangular.

In S2 the CPU 11 reads parameters needed for setting the reduced image size and the reduction algorithm from the printing parameters stored in the printing parameter memory 13e. In the embodiments printing parameters required for these settings are the print mode, paper type, and paper size.

In S3 the CPU 11 determines the reduced image size and the reduction algorithm based on these parameters and stores the determined reduced image size in the reduced image size memory 13f and the reduction algorithm in the reduction algorithm memory 13g. A reduced image will be formed based on the reduced image size and reduction algorithm determined in S3. The process of S3 will be described later in greater detail with reference to FIGS. 6 through 8.

In S4 the CPU 11 generates the reduced image mask (filter Fs (x, y)) and the original image mask (filter F(x, y)) and stores these masks in the mask memory 13h. The process of generating masks will be described later with reference to FIGS. 9(a) through 9(c) In S5 the CPU 11 calculates shift amounts for both the reduced image mask and the original image mask and stores these shift amounts in the shift amount memory 13i. The process for calculating shift amounts will be described later with reference to FIG. 10.

The digital camera 21 or the PC 2 compresses image data according to the JPEG or other compression technique and sequentially stores horizontal lines of pixels in the rectangular image. In the process for forming the reduced image, in S6 the CPU 11 reads one line worth of the stored original image from the PC 2 or the like and stores this line unit in the original image memory 13a of the RAM 13, In S7 the CPU 11 determines whether the number of lines of image data stored in the original image memory 13a is sufficient for performing reduction with the reduction algorithm stored in the reduction algorithm memory 13g. The required number of lines for performing reduction is one line if the reduction algorithm stored in the reduction algorithm memory 13g is the nearest neighbor method, two lines for the bi-linear method, three lines for the bi-cubic technique, and the number of lines corresponding to the reduction ratio for the average pixel method. If the number of lines stored in the original image memory 13a is insufficient for reduction (S7: NO), the CPU 11 returns to S6. When the number of lines is sufficient for reduction (S7: YES), then in S8 the CPU 11 forms a reduced image based on the reduction algorithm and in S9 stores this reduced image in a temporary area (not shown) of the RAM 13. After forming the reduced image, the CPU 11 overwrites data currently stored in the original image memory 13a with subsequent lines of data read for the original image, thereby reducing the required storage capacity of the original image memory 13a.

In S10 the CPU 11 determines whether all lines in the original image have been scanned to form the reduced image. If unprocessed lines remain (S10: NO), the CPU 11 returns to S6. However, if all lines have been processed (S10: YES), then in S11 the CPU 11 converts each pixel in the reduced image to a luminance component Y and color components Cb and Cr.

The luminance component Y and the color components Cb and Cr are calculated from the RGB values of the reduced image based on the following equation 1.

$$\begin{pmatrix} Y \\ Cb \\ Cr \end{pmatrix} = \begin{pmatrix} 0.30 & 0.59 & 0.11 \\ -0.17 & -0.34 & 0.51 \\ 0.51 & -0.43 & -0.08 \end{pmatrix} \begin{pmatrix} R \\ G \\ B \end{pmatrix} \qquad \text{Equation 1}$$

The luminance signal Y and color signals Cb and Cr calculated above may be temporarily stored in the RAM 13 or the like to be used in subsequent processes. However, if it is desirable to reduce the storage volume, these values may be calculated in the above equation 1 by reading pixel values from the image as needed without storing the values in memory.

In S12, the CPU 11 calculates a reflectance Rs (x, y) from the luminance signal Y calculated above for one pixel at a location (x, y) in the reduced image, wherein x is the horizontal coordinate and y is the vertical coordinate. Here, the "s" is added to the end of symbols for indicating the reduced image as opposed to the original image. The reflectance Rs is calculated according to the following equation 2.

$$Rs(x, y) = \log \frac{Ys(x, y)}{Fs(x, y) * Ys(x, y)} \qquad \text{Equation 2}$$

Here, Ys (x, y) is the intensity of the luminance signal Y at the coordinate (x, y) of the reduced image, Fs (x, y) is a filter coefficient of the reduced image mask at the coordinate (x, y), and "*" is the convolution operator. By calculating the value "Fs (x, y)*Ys (x, y)", a convolution operation is performed on the luminance signal for the target pixel (x, y) and the luminance signals for peripheral pixels that surround the target pixel (x, y), thereby determining an average peripheral (or surrounding) pixel value for the target pixel (x, y) Further, log is the natural logarithm to the base "e". The CPU 11 performs this convolution operation by a fixed-point calculation, while setting the decimal point position based on the shift amount for the reduced image stored in the shift amount memory 13i. The thus obtained reflectance Rs(x, y) defines a Retinex image for the reduced image.

In S13, the CPU 11 stores the reflectance Rs (x, y) found in the above calculations in the reflectance memory 13b of the RAM 13.

In S14 the CPU 11 compares the reflectance Rs (x, y) obtained in S13 to maximum and minimum values of reflectance Rs (x, y) values obtained thus far. Specifically, the maximum and minimum values are both set to the reflectance Rs (x, y) found for the first coordinates. All reflectance Rs (x, y) values subsequently obtained are compared with the current maximum and minimum values. If the current reflectance Rs (x, y) is greater than the maximum value, then this reflectance Rs (x, y) is set as the new maximum value. Similarly, if the current reflectance Rs (x, y) is less than the minimum value, then this reflectance Rs (x, y) is set as the new minimum value, When the current reflectance Rs (x, y) is less than the maximum value and greater than the minimum value, the maximum and minimum values remain unchanged.

In S15, the CPU 11 determines whether the process in S12-S14 has been completed for all coordinates in the reduced image. If unprocessed coordinates remain (S15: NO), the CPU 11 returns to S12. However, if the process has been completed for all coordinates (S15: YES), then in S16 the CPU 11 normalizes the reflectance Rs (x, y) values based on the maximum and minimum values obtained in S14 and forms a histogram in the histogram memory 13c.

In S17 the CPU 11 finds a median value M from the histogram formed in S16 and in S18 sets a clipped range of reflectance Rs (x, y) values (normalization parameters) based on the median value M and the histogram.

Figure 4:
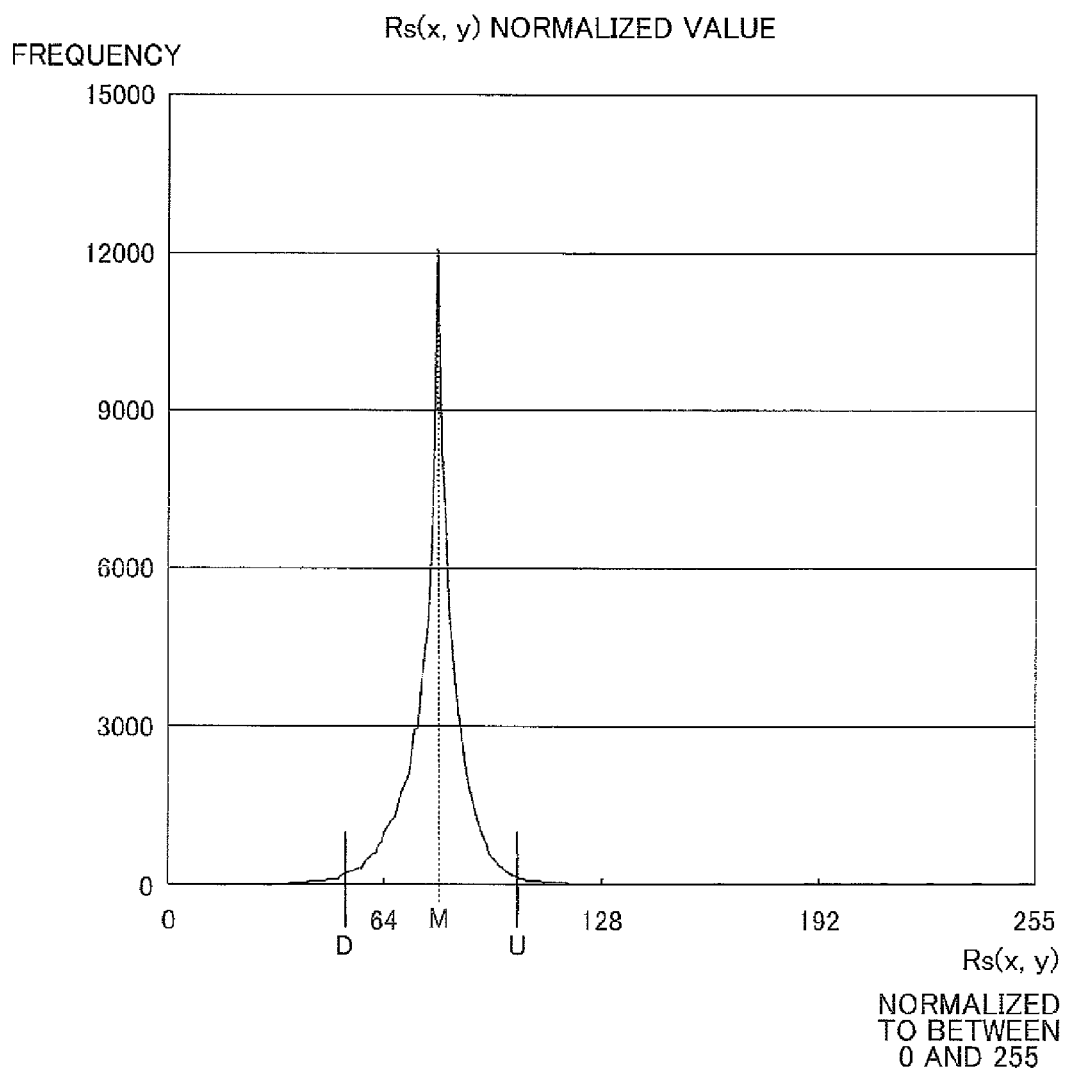
FIG. 4 is a graph conceptually illustrating a clipped range for performing normalization.
Figure 5:
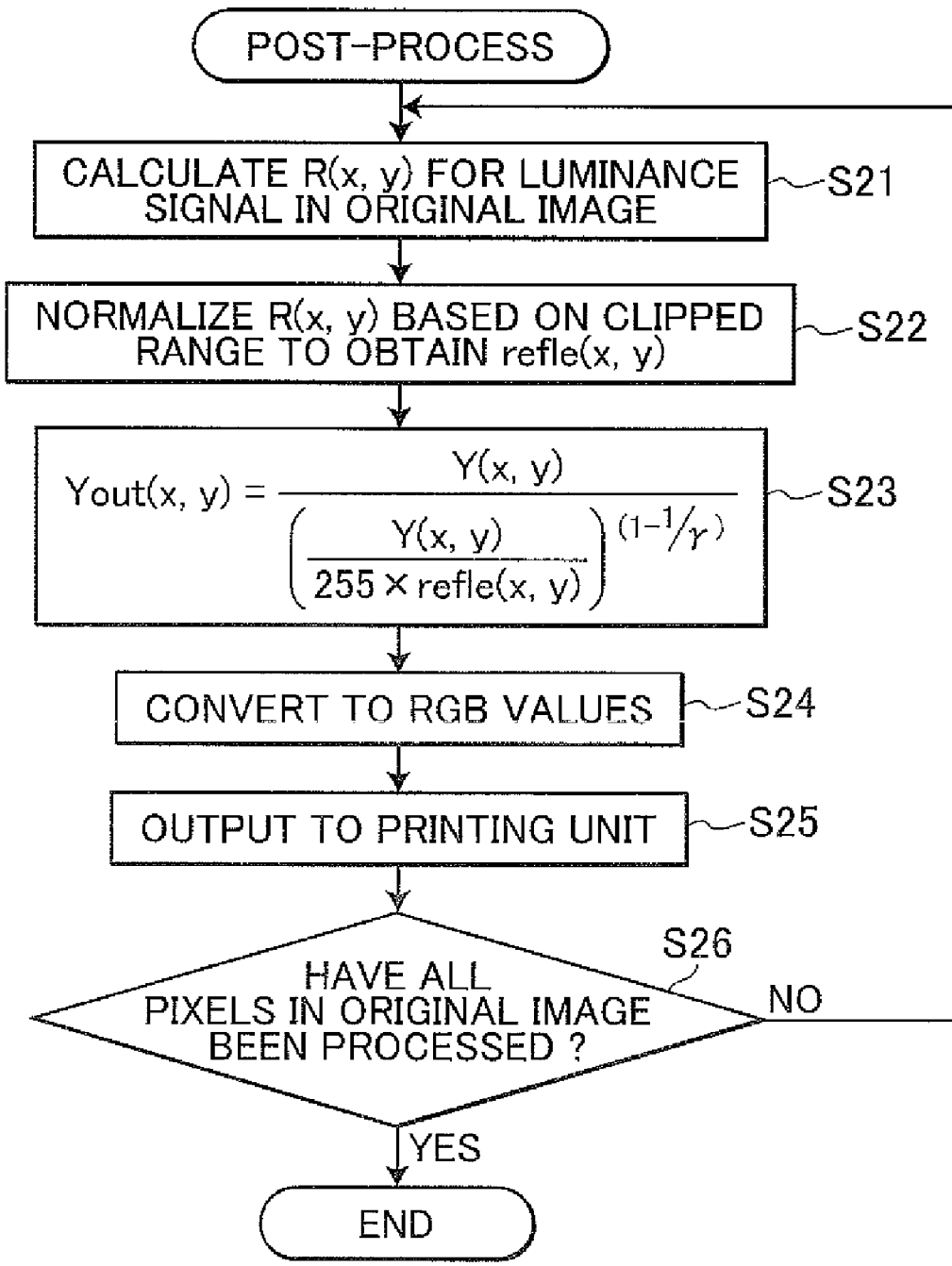
FIG. 5 is a flowchart illustrating steps in a post-process executed after the pre-process.

FIG. 4 is a histogram in which the reflectance Rs (x, y) found in the equation 2 for all coordinates is normalized and mapped on a scale of 256 levels with a minimum value of 0 and a maximum value of 255. Specifically, the normalization is achieved through a process of setting the minimum reflectance Rs (x, y) among all coordinates to 0 and the maximum value to 255 and linearly setting all reflectance Rs (x, y) values for other coordinates to integers between 0 and 255. The histogram is formed in the histogram memory 13c by tabulating the frequency of pixels indicating each computed value between the maximum and minimum values.

From this histogram, a median value M is found. An upper value U and a lower value D are set based on the median value M so that a 45% portion of all the pixels have values falling in a range from the median value M to the upper value U and so that another 45% portion of all the pixels have values falling in a range from the lower value D to the median value M. This ensures that a 5% portion of all the pixels have values greater than the upper value U, and another 5% portion of all the pixels have values smaller than the lower value D. A reflectance Rs(x, y) corresponding to the upper value U is set as an upper limit reflectance value UpR, and a reflectance Rs(x, y) corresponding to the lower value D is set as a lower limit reflectance value DownR. The upper limit reflectance value UpR and lower limit reflectance value DownR determine the upper and lower limits of a clipped range, respectively, and are set as the normalization parameters.

Next, a post-process performed based on the clipped range found in the pre-process of FIG. 3 will be described with reference to FIG. 5. The post-process is a Retinex process performed on the original image FIG. 5 is a flowchart illustrating steps in this Retinex process. The post-process is performed on each pixel in the original image and sequentially outputs processed pixel values (RGB values) to the printing unit 15.

In S21 at the beginning of the process, the CPU 11 finds the luminance signal Y for a pixel at a location (x, y) in the original image based on the equation 1. At this time, color signals Cb and Cr are also obtained for the subject pixel. The CPU 11 further calculates the reflectance R (x, y) for the subject pixel based on the luminance signal Y and based on the following equation 3.

$$R(x, y) = \log \frac{Y(x, y)}{F(x, y) * Y(x, y)} \qquad \text{Equation 3}$$

Here, Y (x, y) is the intensity of the luminance signal Y at the coordinate (x, y) of the original image, F(x, y) is a filter coefficient of the original image mask at the coordinate (x, y), and "*" is the convolution operator. By calculating the value "F (x, y)*Y (x, y)", a convolution operation is performed on the luminance signal for the target pixel (x, y) and the luminance signals for peripheral pixels that surround the target pixel (x, y), thereby determining an average peripheral (or surrounding) pixel value for the target pixel (x, y). Further, log is the natural logarithm to the base e. The CPU 11 performs this convolution operation by a fixed-point calculation, while setting the decimal point position based on the shift amount for the original image stored in the shift amount memory 13i. The thus obtained reflectance R(x, y) defines a Retinex image for the original image.

In S22 the CPU 11 normalizes the reflectance R (x, y) based on the clipped range, which has been found in S18 of FIG. 3 using the reduced image, to obtain a normalized reflectance refle (x, y).

Specifically, the normalized reflectance (normalized Retinex value) refle (x, y) is set to 0.0 when the value of reflectance R (x, y) is less than or equal to the value DownR (lower limit of the clipped range), is set to 1.0 when the value of reflectance R (x, y) is greater than or equal to the value UpR (upper limit of the clipped range), and is calculated based on the following equation 4 when the value of reflectance R (x, y) is greater than DownR and less than UpR.

$$refle(x, y) = \frac{R(x, y) - DownR}{UpR - DownR} \qquad \text{Equation 4}$$

It is noted that the calculation result "refle (x, y)" of Equation 4 is further added with 0.3 and the added result is substituted for the value "refle (x, y)". This ensures that the value "refle (x, y)" falls in a range of 0.3 to 1.3.

The following table shows the difference between a clipped range (upper limit UpR and lower limit DownR) found based on the reduced image, and a clipped range found based on the original image by experiments. In the experiments, the clipped range (upper limit UpR and lower limit DownR) was determined based on the reduced image by executing the processes of S12-S18 on the reflectance values Rs (x, y) in the reduced image. The clipped range (upper limit UpR and lower limit DownR) was determined also based on the original image by executing processes the same as the processes of S12-S18 on the reflectance values R (x, y) in the original image in place of the reflectance values Rs (x, y) of the reduced image.

TABLE 1

|  | Clipped range | | Maximum/Minimum values | |
| --- | --- | --- | --- | --- |
|  | Upper limit | Lower limit | Maximum value | Minimum value |
| Original image | 0.825 | −0.822 | 2.712 | −4.063 |
| Reduced image | 0.742 | −0.755 | 1.729 | −2.607 |
| Difference | 0.083 | 0.067 | 0.983 | 1.456 |

As shown in this table, the maximum value of reflectance values R (x, y) for the original image is 2.712, and the minimum value −4.063, while the maximum value of reflectance values Rs (x, y) for the reduced image is 1.729, and the minimum value −2.607. Hence, the difference between the maximum reflectance for the original image and the maximum reflectance for the reduced image is 0.983, and the difference between the minimum reflectance for the original image and the minimum reflectance for the reduced image is 1.456. These differences are considerably large.

However, the upper limit of the clipped range found based on the reflectance values R (x, y) of the original image is 0.825 and the lower limit −0.822, while the upper limit found based on the reflectance values Rs (x, y) of the reduced image is 0.742 and the lower limit −0.755. Hence, the difference between the upper limit of the clipped range for the reflectance values for the original image and the upper limit of the clipped range for the reflectance values for the reduced image is 0.083, while the difference between the lower limit of the clipped range for the reflectance values for the original image and the lower limit of the clipped range for the reflectance values for the reduced image is 0.067. These differences are small.

Since there is no great difference between the clipped range found based on the reduced image and the clipped range found based on the original image, the clipped range found based on the reduced image can be applied to the original image.

In S23 the CPU 11 performs the Retinex process on luminance Y (x, y) using refle (x, y) in the following equation 5 to obtain a Retinex-corrected luminance value Yout (x, y) (luminance signal Y). Here, γ is an arbitrary constant normally set to 1.5.

$$Yout(x, y) = \frac{Y(x, y)}{\left(\frac{Y(x, y)}{255 \times refle(x, y)}\right)^{(1-1/\gamma)}} \quad \text{Equation 5}$$

In S24 the CPU 11 converts the Retinex-corrected luminance value Yout (x, y) and the color signals Cb and Cr obtained in S21 to RGB values, using the following equation 6.

$$\begin{pmatrix} R \\ G \\ B \end{pmatrix} = \begin{pmatrix} 1.0 & 0 & 1.37 \\ 1.0 & -0.34 & -0.70 \\ 1.0 & 1.73 & 0 \end{pmatrix} \begin{pmatrix} Yout \\ Cb \\ Cr \end{pmatrix} \quad \text{Equation 6}$$

In the process described above, the CPU 11 executes the Retinex process on a luminance signal for the original image and finds pixel values by converting the Retinex-processed luminance signal and the color signals back to RGB values.

In S25 the CPU 11 outputs the processed pixel values to the printing unit 15.

Hence, by identifying the clipped range for performing normalization in the pre-process, the CPU 11 can sequentially process each pixel and output the results to the printing unit 15 in the post-process, thereby reducing the time from the start of image processing to the start of the printing operation.

In S26 the CPU 11 determines whether the above process has been completed for all pixels in the original image. If some unprocessed pixels remain (S26: NO), then the CPU 11 returns to S21. However, if the process has been completed for all pixels (S26: YES), then the CPU 11 ends the post-process.

In this way, the printer 1 of the embodiment uses the clipped range found in the pre-process based on reflectance values Rs (x, y) of the reduced image to find a clipped range for normalizing reflectance values R (x, y) in the original image. Through this process, the printer 1 can find the clipped range in fewer operations than the number of operations required to find the clipped range for the original image, thereby improving processing speed. Further, since the reduced image having fewer pixels than the original image is stored in the temporary area of the RAM 13, the storage capacity need not be as large as when storing the original image.

More specifically, now assume that a clipped range is determined based on the original image. In such a case, the reflectance R (x, y) values must be stored for all the pixels of the original image. An enormous amount of storage capacity will be necessary for storing the reflectance R (x, y) values found through logarithmic computations. Further, since the number of logarithmic computations on the reflectance R (x, y) increases according to the volume of reflectance R (x, y) data, the length of time required before the computer can begin outputting the processed image will increase according to the size of the original image.

Next, the process in S3 of FIG. 3 for determining the reduced image size and reduction algorithm will be described with reference to FIGS. 6 through 8.

As described above, it is possible to determine a clipped range quickly and to perform image processing with a small storage capacity by reducing the original image, determining a clipped range based on the reduced image, and performing a correction process on pixels in the original image based on this clipped range. However, in some cases, it is not possible to set an appropriate clipped range, such as when the reduced image is smaller than necessary, and when the quality of the reduced image is too much degraded. On the other hand, if the reduced image is set to a larger size than necessary or if the quality of the reduced image is set higher than necessary, processing will require a greater length of time, reducing processing speed. Therefore, a reduced image size and reduction algorithm must be selected to suit the user-specified printing parameters and the like.

FIGS. 6 and 7 are look-up tables used to set the reduced image size and reduction algorithm based on the printing mode, paper type, paper size, and original image size. FIG. 6 is a look-up table used for the photo mode, while FIG. 7 is a look-up table used for the normal mode. These tables are stored in the LUT memory 12c of the ROM 12 and are referenced in the process described in the flowchart of FIG. 8.

The table in FIG. 6 is selected when the print mode has been set to the photo mode. Choices for the reduced image size and the reduction algorithm are first categorized by paper type. In the embodiment, the categories of paper type include glossy paper and plain paper, but may also include other categories, such as inkjet paper.

After paper type, the selections are categorized by paper size, in order from smallest to largest. In this example, the categories of paper size are 4"×6", 5"×7", letter, and A4. Each paper size is further categorized by original image size, In this example, possible original image sizes for the input image are 600×800, 1200×1600, and 2400×3200 (pixels). The reduced image size and reduction algorithm are set based on these sizes.

In the embodiment, the reduced image size can be set to one of three selections, 150×200, 300×400, and 450×600, while the reduction algorithm can be set to one of three types, the average pixel method (ME), the bi-linear method (BL), and the nearest neighbor method (NN). The table in FIG. 7 is used when the printing mode has been set to the normal mode. As in the photo mode, selections are categorized by paper type, paper size, and original image size, and the reduced image size and reduction algorithm are set based on these values FIG. 8 is a flowchart illustrating steps in the process of S3 shown in FIG. 4. In S31 of this process, the CPU 11 determines whether the print mode selected as a printing parameter has been set to the photo mode or the normal mode. The CPU 11 selects the table for the photo mode in S32 it the print mode has been set to the photo mode, and selects the table for the normal mode in S33 when the print mode has been set to the normal mode. In S34 the CPU 11 reads the reduced image size and reduction algorithm set corresponding to the paper type and paper size set as printing parameters and the original image size stored in the original image size memory 13d, and stores the reduced image size and reduction algorithm in the reduced image size memory 13f and the reduction algorithm memory 13g, respectively.

Next will be described, with reference to FIGS. 9(a) through 9(c) and 10, the process of S4 for generating masks and the process of S5 for calculating the shift amounts for performing convolution based on the generated masks.

First, the process of S4 for generating masks will be described with reference to FIGS. 9(a) through 9(c).

In S4, the reduced image mask Fs and the original image mask F are generated. The reduced image mask Fs is formed first, followed by the original image mask F.

It is noted that each of the reduced image mask Fs and original image mask F is a filter for calculating the average luminance for pixels around a target pixel and must cover a range of a prescribed size. However, if the mask has filter coefficients for all coordinates in this range, an enormous number of calculations will be performed in convolution. The number of calculations can be reduced by suitably skipping coefficients.

Figure 9A:
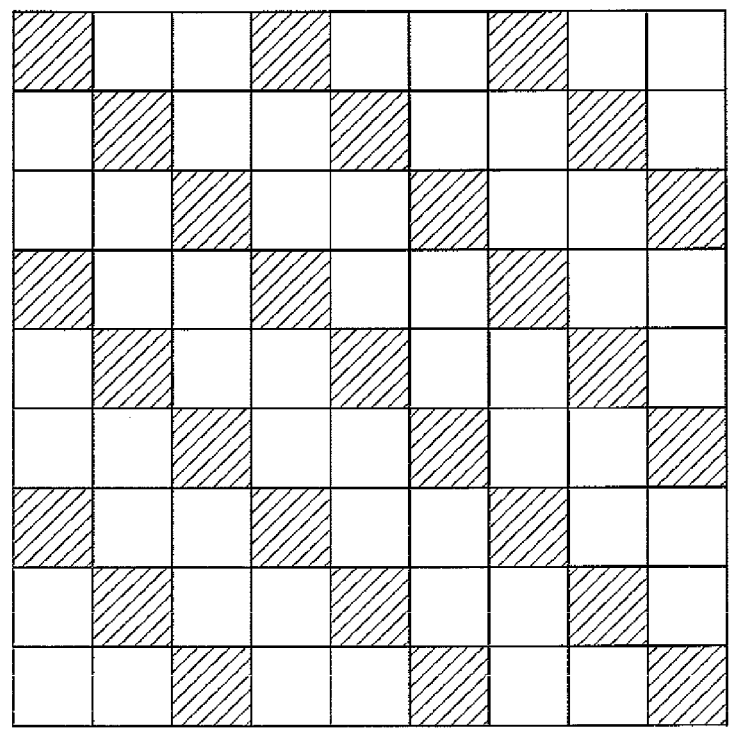
FIG. 9(a) is an explanatory diagram showing which coordinate positions in a reduced image mask have filter coefficients.

FIG. 9(a) is an explanatory diagram showing which coordinate positions in the prescribed range of the reduced image mask have filter coefficients. In the example of FIG. 9(a), the prescribed range of the mask includes 9×9 coordinates, with a filter coefficient provided for one out of three coordinates. In FIG. 9(a), coordinates having a coefficient are indicated by diagonal lines, while coordinates having no coefficient are white. In this example, a skipping rate A is 1/3 . A skipping rate A of 1 indicates that no coordinates are skipped, while a skipping rate A of 1/2 indicates that half of the coordinates are skipped. A skipping rate of 1/3 indicates that 2/3 of the coordinates are skipped.

Since the total number of coordinates is 81 (9×9) and the skipping rate A is 1/3 in the mask shown in FIG. 9(a), the mask has filter coefficients for 81×(1/3)=27 coordinates. Hence, 81−27=54 coordinates are skipped. Here, the number 54 is called the pixel-skipping number.

After determining the coordinate positions at which filter coefficients exist in the reduced image mask, the CPU 11 calculates the filter coefficient for each coordinate using a Gaussian function and stores these coefficients in the mask memory 13h in association with their coordinates, thus generating and storing the reduced image mask Fs. For example, by using the thus generated reduced image mask Fs shown in FIG. 9(a), an average peripheral (or surrounding) luminance value for the target pixel (x, y), that is located on the center of the reduced image mask Fs, will be determined by performing convolution operation on the luminance value of the target pixel (x, y) and the luminance values of the 26 peripheral pixels (x−4, y−4), (x−1, y−4), (x+2, y−4), (x−3, y−3), (x, y−3), (x+3, y−3), (x−2, y−2), (x+1, y−2), (x+4, y−2), (x−4, y−1), (x−1, y−1), (x+2, y−1), (x−3, y), (x+3, y), (x−2, y+1), (x+1, y+1), (x+4, y+1), (x−4, y+2), (x−1, y+2), (x+2, y+2), (x−3, y+3), (x, y+3), (x+3, y+3), (x−2, y+4), (x+1, y+4), (x+4, y+4) that surround the target pixel (x, y).

The size of the original image mask F is found by dividing the size of the reduced image mask Fs by the reduction ratio. The skipping rate A of the original image mask F is set equal to the skipping rate A of the reduced image mask. Additionally, when the nearest neighbor method is used as the reduction algorithm for forming the reduced image, coordinate positions of coefficients are determined so that pixels referenced by the reduced image mask Fs will be referenced by the original image mask F, as well. Accordingly, when processing an original image using a clipped range set with the reduced image, deterioration in image quality can be prevented more reliably than when referencing different pixels in the two images.

In this example, the reduced image mask has a size of 9×9 and has a skipping rate A of 1/3 so that filter coefficients are provided for one of every three coordinates as shown in FIG. 9(a). If the size of the reduced image is one-half that of the original image, the size of the original image mask is set to 18×18 and the skipping rate A is set to 1/3 so that filter coefficients are provided for one of every three coordinates. As a result, the original image mask is set as shown in FIG. 9(b). Also in FIG. 9(b), coordinates having a coefficient are indicated by diagonal lines, while coordinates having no coefficient are white. Since the total number of coordinates in the original image mask F is 324 (18×18) and the skipping rate A is 1/3 in the mask shown in FIG. 9(b), the mask has filter coefficients for 324×(1/3)=108 coordinates. Hence, 324−108=216 coordinates are skipped. The number 216 is called the is pixel-skipping number.

After determining coordinates having coefficients for the original image mask F, the filter coefficient of each coordinate is calculated using the Gaussian function, and the calculated coefficients are stored in the mask memory 13h in association with the coordinates, thus generating and storing the original image mask F. For example, by using the thus generated original image mask F shown in FIG. 9(b), an average peripheral (or surrounding) luminance value for the target pixel (x, y), that is located on one of the four coordinates that are located on the center of the original image mask F, will be determined by performing convolution operation on the luminance value of the target pixel (x, y) and the luminance values of the 107 peripheral pixels that surround the target pixel (x, y). In this example, the target pixel (x, y) is set on the coordinate that is indicated by a circle in FIG. 9(b).

It is noted that in each mask shown in FIGS. 9(a) and 9(c), positions at which coefficients exist are set, with the skipping rate of coefficients to be uniform all over the entire range of the mask.

FIG. 9(c) shows a polar coordinate function PC that can be employed to determine positions in the prescribed range of each mask at which coefficients exist, while setting the skipping rate of coefficients to be non-uniform over the entire range of the mask. This function PC is a logarithmic spiral function expressed by the following equations, where a and b are constants, r is the radius, θ is the angle of deviation, and x and y are the horizontal axis and vertical axis, respectively, in the Cartesian coordinate system.

$$r = a \times e^{b\theta}$$

$$x = r \cos(\theta)$$

$$y = r \sin(\theta)$$

In this function PC, the point of origin is the coordinate corresponding to a target pixel in the center of the mask. Coordinate positions through which the function passes have filter coefficients, while coordinates through which the function does not pass do not have filter coefficients. When using this type of function, regions near the target pixel can be given a high density of filter coefficients, while regions farther away from the target pixel can be given a low density of filter coefficients. Accordingly, the skipping rate of coefficients can be varied between regions near the target pixel and, thus, greatly influencing the peripheral luminance, and regions farther away from the target pixel and, thus, exerting little influence on the peripheral luminance, thereby increasing the pixel-skipping number while suppressing a deterioration in image quality.

In this example, the reduced image mask Fs is preset to that shown in FIG. 9(a). The reduced image mask size is preset to 9×9, and the skipping rate A is preset to 1/3. So, in S4, by calculating the filter coefficients for the reduced image mask Fs using the Gaussian function, the reduced image mask Fs is generated. The original image mask size is determined based on the reduced image mask size and the reduction rate, and the skipping rate A for the original image mask is determined to be equal to the skipping rate A for the reduced image mask. The coordinate positions where filter coefficients exist in the original image mask F are determined so that the coordinate positions where filter coefficients exist in the original image mask F will correspond to the coordinate positions where filter coefficients exist in the reduced image mask Fs, that is, in the same manner as described above with reference to FIG. 9(b). By calculating the filter coefficients for the original image mask F using the Gaussian function, the original image mask F is generated.

In a variation, the polar coordinate function PC shown in FIG. 9(c) can be employed in S4 to determine coordinate positions where filter coefficients exist in the reduced image mask Fs, instead of using the reduced image mask Fs shown in FIG. 9(a). Also in this case, the reduced image mask size is preset to 9×9. By calculating the filter coefficients for the reduced image mask Fs using the Gaussian function, the reduced image mask Fs is generated. Also in this variation, the original image mask size is determined based on the reduced image mask size and the reduction rate. The polar coordinate function PC is also employed to determine coordinate positions where filter coefficients exist in the original image mask F. By calculating the filter coefficients for the original image mask F using the Gaussian function, the original image mask F is generated.

Next, the process of S5 for calculating the shift amount for each of the reduced image mask and the original image mask will be described with reference to FIG. 10. FIG. 10 is a flowchart illustrating steps in the shift amount calculating process of S5.

In S41 of this process, the CPU 11 calculates a mask reference number P for each of the reduced image mask and the original image mask. The mask reference number P is calculated according to the following equation, where A is the skipping rate, and MaskSize is the size of the corresponding mask.

$$P = A \times \text{MaskSize}.$$

In the reduced image mask shown in FIG. 9(a), P=27, since the mask size is 81 and A is 1/3.

Figure 9B:
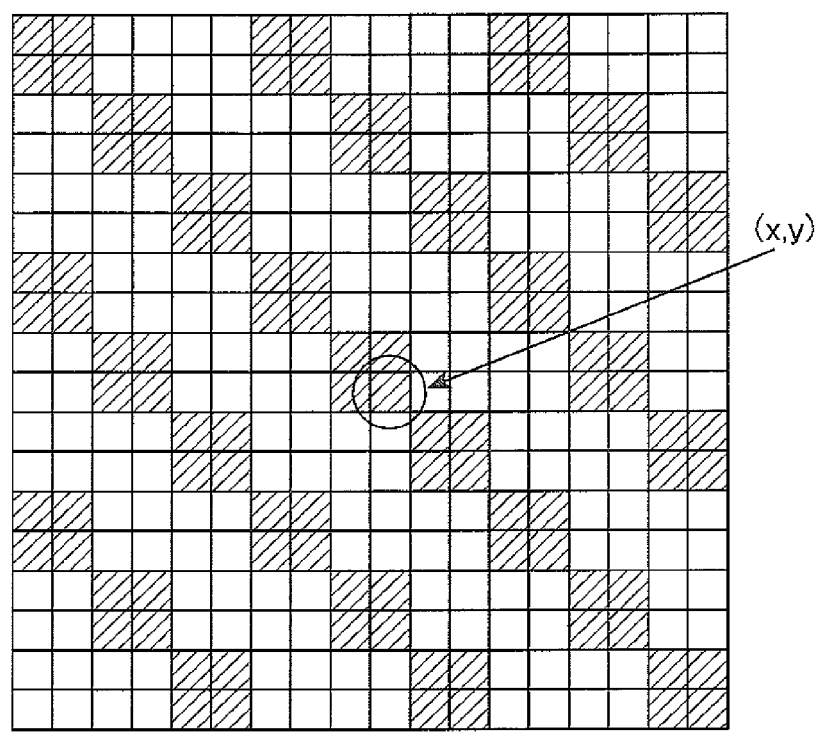
FIG. 9(b) is an explanatory diagram showing which coordinate positions in an original image mask have filter coefficients.

In the original image mask shown in FIG. 9(b), P=108, since the mask size is 324 and A is 1/3.

It is noted that the reference number P indicates the total number of locations in the mask, where filter coefficients exist. So, the reference number P can be determined even for a mask that is determined by using the polar coordinate function PC shown in FIG. 9(c), by counting up the number of locations where filter coefficients exist.

In S42 the CPU 11 finds a maximum value ConvMax of calculations in each of the convolution operation that uses the reduced image mask and the convolution operation that uses the original image mask. ConvMax is calculated according to the following equation, where B is the maximum filter coefficient in the corresponding mask, and PixelMax is the maximum pixel value (maximum luminance value) that will possibly appear in the corresponding convolution operation.

$$\text{ConvMax} = P \times B \times \text{PixelMax}$$

In this example, the maximum luminance value is 255.

In S43 the CPU 11 calculates a shift amount BitMax for each of the convolution operation that uses the reduced image mask and the convolution operation that uses the original image mask. The shift amount BitMax is calculated as the maximum value that satisfies the following expression, where ValueMax is a maximum value that the CPU 11 can handle in a fixed-point calculation. That is, the value "ValueMax" is equal to the maximum value that the CPU 11 can handle when the decimal point is set in a least significant bit (LSB) location in each register.

$$2^{BitMax} \leq \frac{ValueMax}{ConvMax}$$

Now assume that each register in the CPU 11 has a 32 bit length. In such a case, the value "ValueMax" is equal to $2^{32}$ (=4,294,967,296). If the value "PixelMax" is equal to 255, the value "B" is equal to 1, and the value "P" is equal to 27, the value "ValueMax/ConvMax" is equal to 623815.... Because $2^{15}$=32768 and $2^{16}$=65536, the value "BitMax" is set equal to 15. Accordingly, it is known that the decimal point should be set at a location that is shifted from the most significant bit (MSB) location by fifteen in a direction toward the least significant bit location.

In S44 the CPU 11 stores, in the shift amount memory 13i, the shift amount calculated above for each of the reduced image mask Fs and the original image mask F In the above equation for calculating ConvMax, the filter coefficients are all calculated using the same, maximum value B. However, ConvMax can be calculated with greater precision using the following equation, where Wfunc(r) is the filter coefficient, and r is the distance from the target pixel.

$$ConvMax = \sum_{i=1}^{P} PixelMax \times Wfunc(r)$$

When obtaining the maximum value ConvMax using the value of the filter coefficient for each pixel in this way, the computations are more complex, but a decimal point position that does not produce overflow can be set more reliably, and convolution can be performed with greater precision.

When using the multi-scale Retinex (MSR) method, a plurality of convolution operations are executed a plurality of masks, respectively. So, ConvMax may be found for each of the plurality of masks, and the shift amount is found for each ConvMax according to equation 8. Each of the plurality of convolution operations is executed by using the corresponding mask and the corresponding shift amount.

In the embodiment described above, the CPU 11 sets a shift amount for the convolution operation performed in the Retinex process based on the size of the used mask, the pixel-skipping number, and the like. The decimal point position can be set to an appropriate position to achieve precise calculations in the convolution operation with the CPU 11 having the limited bit number. Hence, precision can be maintained when performing convolution with fixed-point operations, without producing overflow.

Even though the CPU 11 attains calculations with a too low processing speed with a too small bit number to perform the floating-point operations, the CPU 11 can still perform the Retinex process with high accuracy by executing the fixed-point operations. So, the printer 1 can be made inexpensive.

While the invention has been described in detail with reference to the specific embodiment thereof, it would be apparent to those skilled in the art that many modifications and variations may be made therein without departing from the spirit of the invention, the scope of which is defined by the attached claims.

For example, the color system in the embodiment described above is the RGB color model, but a color system other than the RGB color model may be used. For example, the present invention may be applied to the CMY color model or the like.

In the embodiment described above, the CPU 11 provided in the printer 1 executes the image-processing program according to the present embodiment. However, this program may be provided to a personal computer as an application program that is executed by a CPU or the like provided in the personal computer.

Either the single-scale Retinex (SSR) or multi-scale Retinex (MSR) method may be used in the Retinex process.

In the image process of the embodiment described above, the CPU 11 performs the Retinex process and the like. However, these processes may be performed with a digital signal processor (DSP) The DSP can be used to execute product-sum operations and other operations more quickly.

In the embodiment, the original pixel values RGB are converted to the luminance value, which is then subjected to the Retinex process. However, the original pixel values RGB may be subjected to the Retinex process The printer 1 may be modified to other various types of image processing devices. Even though the arithmetic unit in the image processing device attains calculations with a too low processing speed and a too small bit number to perform the floating-point operations, the image processing device can still perform the Retinex process with high accuracy by executing the fixed-point operations. So, the image processing device can be made inexpensive In the embodiment, the size of the reduced image mask is fixed regardless of the size of the reduced image. However, the size of the reduced image mask may be determined so as to vary dependently on the size of the reduced image.

What is claimed is:

1. An image processor comprising:
a decimal point position determining unit that determines a position of a decimal point based on a size of a mask that has a plurality of filter coefficients;
an image inputting unit that receives image data indicative of an image having a plurality of pixels, the image data including a pixel value for each pixel; and
a calculating unit that performs, while setting a decimal point to be fixed at the determined position, a convolution operation on a pixel value of each pixel and pixel values of peripheral pixels for the each pixel by using the filter coefficients of the mask to find an average peripheral pixel value for the each pixel,
wherein the calculating unit includes a storage area storing a calculated result calculated by the calculating unit, the storage area being capable of storing data of a predetermined number of bits and having a predetermined bit location therein,
wherein the decimal point position determining unit determines a shift amount based on the size of the mask, and determines the decimal point at a position in the storage area that is shifted from the predetermined bit location by the determined shift amount.

2. An image processor according to claim 1, further comprising a mask size setting unit that sets a size of the mask.

3. An image processor according to claim 1, further comprising a reflectance value calculating unit that finds a reflectance value for each pixel in the image based on the pixel value of each pixel and the average peripheral pixel value for the each pixel, thereby forming a Retinex image for the inputted image.

4. An image processor according to claim 1, wherein the mask has a plurality of locations, each location corresponding to one pixel, the locations including at least one filter coefficient location and at least one no-coefficient location, a filter coefficient being provided in each coefficient location, no filter coefficient being provided in each no-coefficient location, a reference number being determined based on the number of the at least one coefficient location, wherein the decimal point position determining unit determines the position of the decimal point based on the reference number.

5. An image processor according to claim 4, wherein the decimal point position determining unit determines the position of the decimal point based on a product of the reference number, a maximum pixel value that each pixel will possibly have, and a maximum filter coefficient among the filter coefficients in the mask.

6. An image processor according to claim 4, wherein the decimal point position determining unit determines the position of the decimal point based on a sum of products for all the filter coefficients in the mask and a maximum pixel value that each pixel will possibly have.

7. An image processor comprising:
a decimal point position determining unit that determines a position of a decimal point based on a size of a mask that has a plurality of filter coefficients;
an image inputting unit that receives image data indicative of an image having a plurality of pixels, the image data including a pixel value for each pixel; and
a calculating unit that performs, while setting a decimal point to be fixed at the determined position, a convolution operation on a pixel value of each pixel and pixel values of peripheral pixels for the each pixel by using the filter coefficients of the mask to find an average peripheral pixel value for the each pixel,
wherein the image inputting unit receives original image data indicative of an original image having a plurality of pixels, the original image data including a pixel value for each pixel,
wherein the image processor further comprises a reduced image forming unit that reduces an original image into a reduced image by converting the original image data into a reduced image data indicative of the reduced image having a plurality of pixels, the reduced image data including a pixel value for each pixel, the number of the pixels in the reduced image being smaller than the number of the pixels in the original image,
wherein the decimal point position determining unit includes:
a first decimal point position determining unit that determines a first position of the decimal point based on a size of a reduced-image mask that has a plurality of first filter coefficients; and
a second decimal point position determining unit that determines a second position of the decimal point based on a size of an original-image mask that has a plurality of second filter coefficients;
wherein the calculating unit includes a first calculating unit that performs, while setting a decimal point to be fixed at the determined first position, a first convolution operation on the pixel value of each pixel in the reduced image and pixel values of peripheral pixels for the each pixel in the reduced image by using the first filter coefficients of the reduced-image mask, thereby finding an average peripheral pixel value for the each pixel in the reduced image;
wherein the image processor further comprises:
  a reduced Retinex image forming unit that forms a reduced Retinex image by finding a reflectance value for each pixel in the reduced image based on the pixel value of each pixel and the average peripheral pixel value for the each pixel; and
  a normalization parameter setting unit that tabulates frequencies of each reflectance value within the entire range of reflectance values in the reduced Retinex image and sets a parameter for normalization,
wherein the calculating unit further includes a second calculating unit that performs, while setting a decimal point to be fixed at the determined second position, a second convolution operation on the pixel value of each pixel in the original image and pixel values of peripheral pixels for the each pixel in the original image by using the second filter coefficients of the reduced-image mask, thereby finding an average peripheral pixel value for the each pixel in the original image;
  wherein the image processor further comprises a correcting unit that finds a reflectance value for each pixel in the original image based on the pixel value of each pixel in the original image and the average peripheral pixel value for the each pixel in the original image, that finds a normalized Retinex value by normalizing the reflectance value for the each pixel in the original image based on the normalization parameter, and that performs correction on the pixel value of the each pixel in the original image based on the normalized Retinex value.

8. An image processor according to claim 7, further comprising an original-image mask size setting unit that sets the size of the original-image mask based on the size of the reduced-image mask and on a reduction ratio between the reduced image and the original image.

9. An image processor according to claim 8, further comprising a reduced-image mask generating unit that generates the reduced-image mask.

10. A method of processing an image, the method comprising:
determining a position of a decimal point based on a size of a mask that has a plurality of filter coefficients;
receiving image data indicative of an image having a plurality of pixels, the image data including a pixel value for each pixel; and
performing, while setting a decimal point to be fixed at the determined position, a convolution operation on a pixel value of each pixel and pixel values of peripheral pixels for the each pixel by using the filter coefficients of the mask to find an average peripheral pixel value for the each pixel,
wherein the decimal point position determining determines a shift amount based on the size of the mask with respect to a storage area that is capable of storing data of a predetermined number of bits and that has a predetermined bit location therein, and determines the decimal point at a position in the storage area that is shifted from the predetermined bit location by the determined shift amount, and
  wherein the convolution operation is performed by storing its calculated result in the storage area, while setting the decimal point to be fixed at the determined position.

11. A method according to claim 10, further comprising setting a size of the mask.

12. A method according to claim 10, further comprising finding a reflectance value for each pixel in the image based on the pixel value of each pixel and the average peripheral pixel value for the each pixel, thereby forming a Retinex image for the inputted image.

13. A method according to claim 10, wherein the mask has a plurality of locations, each location corresponding to one pixel, the locations including at least one filter coefficient location and at least one no-coefficient location, a filter coefficient being provided in each coefficient location, no filter coefficient being provided in each no-coefficient location, a reference number being determined based on the number of the at least one coefficient location, wherein the position of the decimal point is determined based on the reference number.

14. A method according to claim 13, wherein the position of the decimal point is determined based on a product of the reference number, a maximum pixel value that each pixel will possibly have, and a maximum filter coefficient among the filter coefficients in the mask.

15. A method according to claim 13, wherein the position of the decimal point is determined based on a sum of products for all the filter coefficients in the mask and a maximum pixel value that each pixel will possibly have.

16. A method of processing an image, the method comprising:
- determining a position of a decimal point based on a size of a mask that has a plurality of filter coefficients;
- receiving image data indicative of an image having a plurality of pixels, the image data including a pixel value for each pixel; and
- performing, while setting a decimal point to be fixed at the determined position, a convolution operation on a pixel value of each pixel and pixel values of peripheral pixels for the each pixel by using the filter coefficients of the mask to find an average peripheral pixel value for the each pixel,
- wherein the receiving image data receives original image data indicative of an original image having a plurality of pixels, the original image data including a pixel value for each pixel,
  - the method further comprises reducing an original image into a reduced image by converting the original image data into a reduced image data indicative of the reduced image having a plurality of pixels, the reduced image data including a pixel value for each pixel, the number of the pixels in the reduced image being smaller than the number of the pixels in the original image,
- wherein the decimal point position determining includes:
- determining a first position of the decimal point based on a size of a reduced-image mask that has a plurality of first filter coefficients; and
- determining a second position of the decimal point based on a size of an original-image mask that has a plurality of second filter coefficients;
- wherein the performing the convolution operation includes performing, while setting a decimal point to be fixed at the determined first position, a first convolution operation on the pixel value of each pixel in the reduced image and pixel values of peripheral pixels for the each pixel in the reduced image by using the first filter coefficients of the reduced-image mask, thereby finding an average peripheral pixel value for the each pixel in the reduced image;
- wherein the method further comprises:
  - forming a reduced Retinex image by finding a reflectance value for each pixel in the reduced image based on the pixel value of each pixel and the average peripheral pixel value for the each pixel; and
  - tabulating frequencies of each reflectance value within the entire range of reflectance values in the reduced Retinex image and setting a parameter for normalization,
- wherein the performing the convolution operation further includes performing, while setting a decimal point to be fixed at the determined second position, a second convolution operation on the pixel value of each pixel in the original image and pixel values of peripheral pixels for the each pixel in the original image by using the second filter coefficients of the reduced-image mask, thereby finding an average peripheral pixel value for the each pixel in the original image,
  - wherein the method further includes:
- finding a reflectance value for each pixel in the original image based on the pixel value of each pixel in the original image and the average peripheral pixel value for the each pixel in the original image;
- finding a normalized Retinex value by normalizing the reflectance value for the each pixel in the original image based on the normalization parameter; and
- performing correction on the pixel value of the each pixel in the original image based on the normalized Retinex value.

17. A method according to claim 16, further comprising setting the size of the original-image mask based on the size of the reduced-image mask and on a reduction ratio between the reduced image and the original image.

18. A method according to claim 17, further comprising generating the reduced-image mask.

19. A computer-readable storage device storing a set of program instructions executable on a computer, the program instructions comprising:
- determining a position of a decimal point based on a size of a mask that has a plurality of filter coefficients;
- receiving image data indicative of an image having a plurality of pixels, the image data including a pixel value for each pixel; and
- performing, while setting a decimal point to be fixed at the determined position, a convolution operation on a pixel value of each pixel and pixel values of peripheral pixels for the each pixel by using the filter coefficients of the mask to find an average peripheral pixel value for the each pixel,
- wherein the decimal point position determining determines a shift amount based on the size of the mask with respect to a storage area that is capable of storing data of a predetermined number of bits and that has a predetermined bit location therein, and determines the decimal point at a position in the storage area that is shifted from the predetermined bit location by the determined shift amount, and
- wherein the convolution operation is performed by storing its calculated result in the storage area, while setting the decimal point to be fixed at the determined position.

20. A computer-readable storage device according to claim 19, wherein the program instructions further comprises setting a size of the mask.

21. A computer-readable storage device according to claim 19, wherein the program instructions further comprises finding a reflectance value for each pixel in the image based on the pixel value of each pixel and the average peripheral pixel value for the each pixel, thereby forming a Retinex image for the inputted image.

22. A computer-readable storage device according to claim 19, wherein the mask has a plurality of locations, each location corresponding to one pixel, the locations including at least one filter coefficient location and at least one no-coefficient location, a filter coefficient being provided in each coefficient location, no filter coefficient being provided in each no-coefficient location, a reference number being determined based on the number of the at least one coefficient location, wherein the position of the decimal point is determined based on the reference number.

23. A computer-readable storage device according to claim 22, wherein the position of the decimal point is determined based on a product of the reference number, a maximum pixel value that each pixel will possibly have, and a maximum filter coefficient among the filter coefficients in the mask.

24. A computer-readable storage device according to claim 22, wherein the position of the decimal point is determined based on a sum of products for all the filter coefficients in the mask and a maximum pixel value that each pixel will possibly have.

25. A computer-readable storage device storing a set of program instructions executable on a computer, the program instructions comprising:

determining a position of a decimal point based on a size of a mask that has a plurality of filter coefficients;

receiving image data indicative of an image having a plurality of pixels, the image data including a pixel value for each pixel; and performing, while setting a decimal point to be fixed at the determined position, a convolution operation on a pixel value of each pixel and pixel values of peripheral pixels for the each pixel by using the filter coefficients of the mask to find an average peripheral pixel value for the each pixel, wherein the receiving image data receives original image data indicative of an original image having a plurality of pixels, the original image data including a pixel value for each pixel, wherein the program instructions further comprises reducing an original image into a reduced image by converting the original image data into a reduced image data indicative of the reduced image having a plurality of pixels, the reduced image data including a pixel value for each pixel, the number of the pixels in the reduced image being smaller than the number of the pixels in the original image, wherein the decimal point position determining includes:

determining a first position of the decimal point based on a size of a reduced-image mask that has a plurality of first filter coefficients; and determining a second position of the decimal point based on a size of an original-image mask that has a plurality of second filter coefficients;

wherein the performing the convolution operation includes performing, while setting a decimal point to be fixed at the determined first position, a first convolution operation on the pixel value of each pixel in the reduced image and pixel values of peripheral pixels for the each pixel in the reduced image by using the first filter coefficients of the reduced-image mask, thereby finding an average peripheral pixel value for the each pixel in the reduced image, wherein the program instructions further comprises:

forming a reduced Retinex image by finding a reflectance value for each pixel in the reduced image based on the pixel value of each pixel and the average peripheral pixel value for the each pixel; and tabulating frequencies of each reflectance value within the entire range of reflectance values in the reduced Retinex image and setting a parameter for normalization, wherein the performing the convolution operation further includes performing, while setting a decimal point to be fixed at the determined second position, a second convolution operation on the pixel value of each pixel in the original image and pixel values of peripheral pixels for the each pixel in the original image by using the second filter coefficients of the reduced-image mask, thereby finding an average peripheral pixel value for the each pixel in the original image, wherein the program instructions further comprises:

finding a reflectance value for each pixel in the original image based on the pixel value of each pixel in the original image and the average peripheral pixel value for the each pixel in the original image;

finding a normalized Retinex value by normalizing the reflectance value for the each pixel in the original image based on the normalization parameter; and performing correction on the pixel value of the each pixel in the original image based on the normalized Retinex value.

26. A computer-readable storage device according to claim 25, wherein the program instructions further comprises setting the size of the original-image mask based on the size of the reduced-image mask and on a reduction ratio between the reduced image and the original image.

27. A computer-readable storage device according to claim 26, wherein the program instructions further comprises generating the reduced-image mask.

* * * * *